United States Patent [19]
Humpert et al.

[11] Patent Number: 5,896,601
[45] Date of Patent: Apr. 27, 1999

[54] SINGLE-CONTROL MIXING VALVE

[75] Inventors: Jürgen Humpert, Hemer; Manfred Pawelzik, Soest, both of Germany

[73] Assignee: Friedrich Grohe AG, Hemer, Germany

[21] Appl. No.: 08/962,373

[22] Filed: Oct. 31, 1997

[30] Foreign Application Priority Data

Nov. 21, 1996 [DE] Germany ............................ 196 48 114

[51] Int. Cl.$^6$ ..................................................... E03C 1/04
[52] U.S. Cl. ................................................... 4/677; 4/676
[58] Field of Search .............................. 4/677, 676, 675, 4/678

[56] References Cited

U.S. PATENT DOCUMENTS

| | | | |
|---|---|---|---|
| 4,362,186 | 12/1982 | Parkinson et al. ........................... | 4/677 |
| 5,022,429 | 6/1991 | Rollini et al. ................................ | 4/675 |
| 5,608,928 | 3/1997 | Wang ........................................ | 4/676 |

FOREIGN PATENT DOCUMENTS

| | | |
|---|---|---|
| 0 309 443 | 3/1987 | European Pat. Off. . |
| 0 392 441 | 10/1990 | European Pat. Off. . |
| 0662577 | 7/1995 | European Pat. Off. . |
| 195 07 195 | 9/1996 | Germany . |
| 2192256 | 1/1988 | United Kingdom . |

Primary Examiner—David J. Walczak
Attorney, Agent, or Firm—Herbert Dubno; Andrew Wilford

[57] ABSTRACT

A mixing valve has a housing holding a fixed valve plate a flat outer surface generally centered on and perpendicular to an axis and formed offset from the axis with a pair of angularly offset and axially throughgoing inlet ports and offset therefrom with a pair of axially throughgoing outlet ports. Hot and cold water is supplied under pressure to the inlet ports and passages in the housing connect the outlet ports to respective users, e.g. a faucet and a shower. A movable valve plate in the housing has an inner surface flatly engaging the outer surface of the fixed valve plate and an opposite outer surface and is formed with an axially throughgoing inlet port alignable with the fixed-plate inlet ports and offset from the respective inlet port an axially throughgoing outlet port alignable with the fixed-plate outlet ports. A cover element fixed in the housing to the outer surface of the movable plate forms a fluid-flow passage at the outer surface between the movable-plate inlet port and the movable-plate outlet port. An actuator can shift the cover element and movable plate between a closed position with one of the movable-plate ports out of alignment with the respective fixed-plate ports and blocked by the fixed-plate outer face and two open position in each of which the movable-plate inlet port aligned with at least one of the fixed-plate inlet ports and the movable-plate outlet port aligned with a respective one of the fixed-plate outlet ports.

11 Claims, 10 Drawing Sheets

SINGLE-CONTROL MIXING VALVE

FIELD OF THE INVENTION

The present invention relates to a single-control mixing valve. More particularly this invention concerns such a valve that can direct its mixed-water outlet to a spout or a shower.

BACKGROUND OF THE INVENTION

A standard single-lever flow-control valve has a fixed valve plate formed with a pair of inlet ports respectively connected to hot- and cold-water inlet lines and, offset therefrom, an outlet port connected to an outlet line normally leading to a faucet. A movable valve plate sitting atop this fixed valve plate has a mixing cavity open toward the fixed plate and movable to variously overlap the ports. When the movable plate is pivoted about a normally upright axis perpendicular to the interface between the plates it can align more of one of the inlet ports with the mixing cavity and less of the other inlet port to vary the ratio of hot and cold water fed to the outlet port, and when slid in a front-to-back direction parallel to the plate interface it can control the overall extent of overlap to vary the overall flow from the inlet ports through the mixing cavity to the outlet port.

Typically the movable valve plate is pivoted on the bottom end of a lever that is centrally pivoted on a housing liner that is coupled to the movable plate to rotate it about the upright axis. The upper end of the lever is fitted to a handle that is raised and lowered to control volume rate of flow and that is pivoted from side to side to control outlet temperature.

It is known from European patent application 0,392,441 of P. Scheffer to provide an extra outlet port for a second user, that is so that the same mixing valve can feed, for example, a faucet constituting a first user and a shower constituting a separate second user. The lever must be thrown to one side or the other to control the respective user, normally working in 180° offset positions for the two users. Thus such a mixing valve can only be mounted where there is ample room to move and manipulate its actuating lever. Furthermore the displacement through 180° to change users is inconvenient even when there is enough room to do it.

In European 0,309,443 of C. Dagiantis such a valve is shown which has three valve disks and that can supply two different users. This arrangement is quite complex, prone to leakage, and expensive to manufacture.

OBJECTS OF THE INVENTION

It is therefore an object of the present invention to provide an improved single-lever mixing valve.

Another object is the provision of such an improved single-lever mixing valve which overcomes the above-given disadvantages, that is which allows the easy selection of either of two users with full volume and temperature and control for each user.

SUMMARY OF THE INVENTION

A mixing valve has according to the invention a housing holds a fixed valve plate having a flat outer surface generally centered on and perpendicular to an axis and formed offset from the axis with a pair of angularly offset and axially throughgoing inlet ports and offset therefrom with a pair of axially throughgoing outlet ports. Hot and cold water is supplied under pressure to the inlet ports and passages in the housing connecting the outlet ports to respective users, e.g. a faucet and a shower. A movable valve plate in the housing has an inner surface flatly engaging the outer surface of the fixed valve plate and an opposite outer surface and is formed with an axially throughgoing inlet port alignable with the fixed-plate inlet ports and offset from the respective inlet port with an axially throughgoing outlet port alignable with the fixed-plate outlet ports. A cover element fixed in the housing to the outer surface of the movable plate forms a fluid-flow passage at the outer surface between the movable-plate inlet port and the movable-plate outlet port. An actuator can shift the cover element and movable plate between a closed position with one of the movable-plate ports out of alignment with the respective fixed-plate ports and blocked by the fixed-plate outer face, one open position with the movable-plate inlet port aligned with at least one of the fixed-plate inlet ports and the movable-plate outlet port aligned with one of the fixed-plate outlet ports, and another open position with the movable-plate inlet port aligned with at least one of the fixed-plate inlet ports and the movable-plate outlet port aligned with the other of the fixed-plate outlet ports.

Thus with this system a simple two-disk system is used to provided both temperature and flow control of water to two different users. Normally the lever is displaced up to control the volume of flow to one of the users, down to control flow to the other user, and from side to side to control temperature to either user. Alternately as the handle is raised or lowered first the one user, normally the faucet, is supplied with water and further movement of the handle in the same direction then cuts off the supply to the faucet and furnishes it to the other user, normally the shower. Thus the person operating the faucet can adjust temperature using the faucet and then easily switch to the shower.

According to the invention in the closed position the movable-valve inlet port is blocked by the fixed-plate outer face or the movable-valve outlet port is blocked by the fixed-plate outer face. At least one of the ports has an edge formed with flow-quieting teeth. The actuator includes a lever engaged between the housing and the cover element and stop means for inhibiting displacement of the lever for displacement of the movable plate into one of the open positions. Such a stop arrangement is described in commonly owned U.S. Pat. No. 5,522,429. This stop is a laterally elastically deflectable stop.

In accordance with the invention the movable valve plate lies in the closed position between the positions it assumes in the open positions. The ports are normally formed at least partially as circle segments.

In one arrangement according to the invention the fixed-plate inlet ports have a radial dimension equal to about twice a radial dimension of the movable-plate inlet port. The fixed-plate outlets are radially spaced from each other and formed at least partially as circle segments. The movable plate outlet port lie radially outside the fixed-plate outlet ports in the closed position so that as the movable-plate outlet port is moved radially inward it first overlaps one of the fixed-plate outlet ports and then the other of the fixed-plate outlet ports. In this and other arrangements the movable-plate outlet port has a radial dimension greater than a radial spacing between the fixed-plate outlet ports so that on movement between the open positions the movable-plate outlet port can overlie both fixed-plate outlet ports. Thus there is no shutoff of flow on switching between users.

According to another system of this invention the movable plate is formed with a pair of radially spaced inlet ports, the fixed-plate outlet ports are radially spaced from each other, and the fixed-plate inlet port lies between the movable-plate inlet ports and the movable plate outlet port lies between the fixed-plate outlet ports in the closed position. Thus the movable plate is displaced radially in one direction from the closed position to the one open position and in the opposite direction to the other open position.

The fixed-plate outlet ports according to another system of this invention flank the axis. The movable-plate outlet port is generally circular, lies between the movable-plate outlet ports, and is centered on the axis in the closed position. In this arrangement the fixed plate can be formed with two pairs of such inlet ports symmetrically flanking the axis outside the respective outlet ports. The movable disk is formed with two such outlet ports symmetrically flanking the axis in the closed position.

BRIEF DESCRIPTION OF THE DRAWING

The above and other objects, features, and advantages will become more readily apparent from the following description, reference being made to the accompanying drawing in which.

SPECIFIC DESCRIPTION

As seen in FIGS. 1 through 8, a valve according to the invention has a housing 1 formed with cold- and hot-water inlet connections 11 and 12 and has a spout outlet 16 that normally opens into a sink or tub and a further outlet connection 13 that is normally connected to a telephone-type hand shower. The housing 1 further has a seat 15 holding a valve cartridge 2 described in detail below. A single handle 10 on the housing 1 operates the cartridge 2 to supply to either the outlet 13 or the outlet 16 a mixture of hot and cold water.

Figure 1:
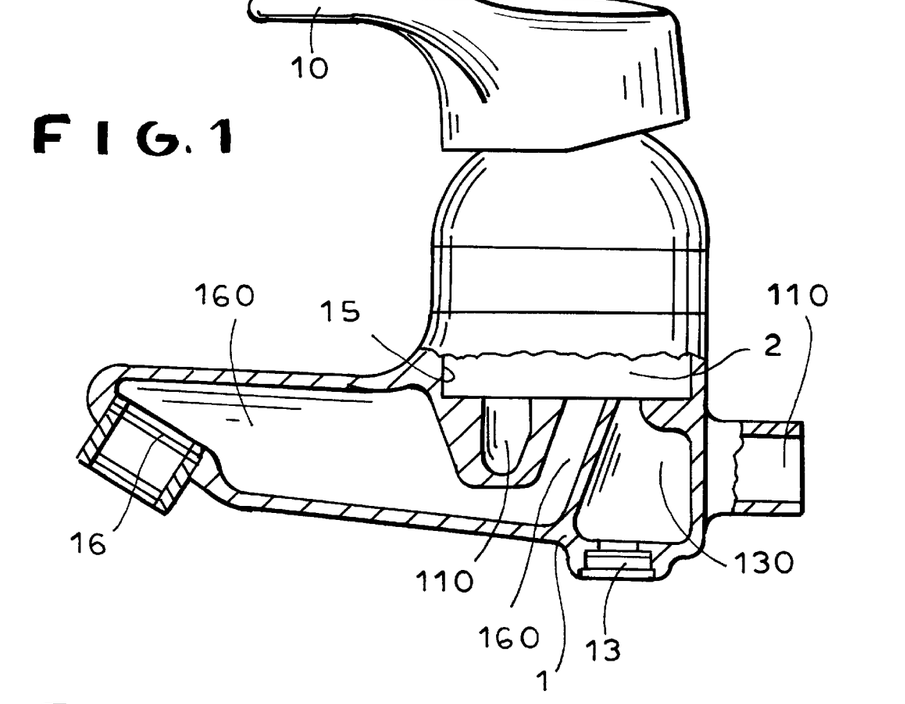
FIG. 1 is a side view partly in section of a first valve according to the invention
Figure 2:
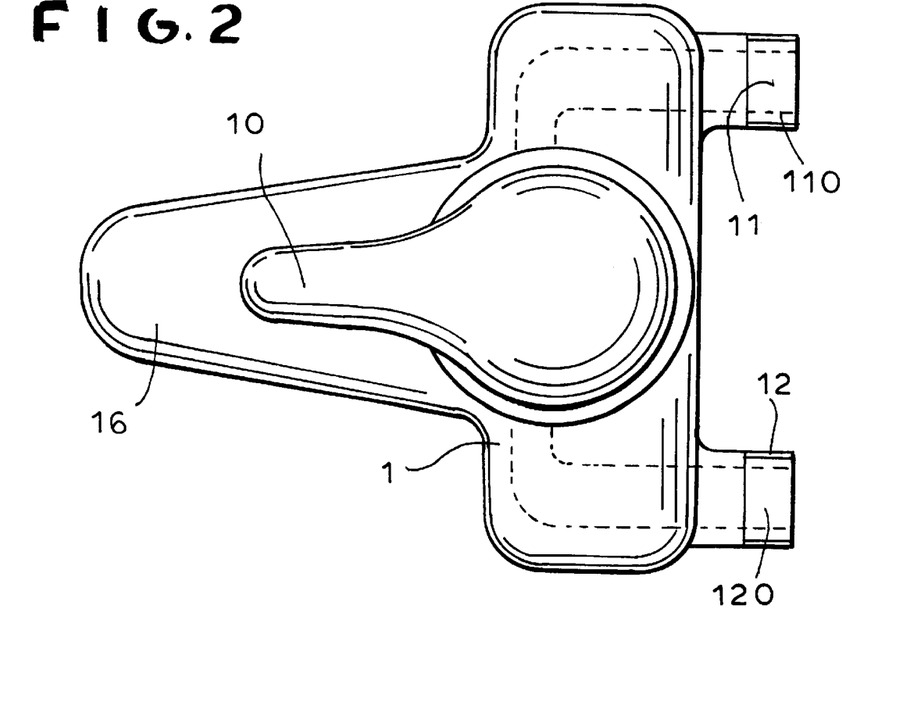
FIG. 2 is a top view of the valve of FIG. 1.
Figure 3:
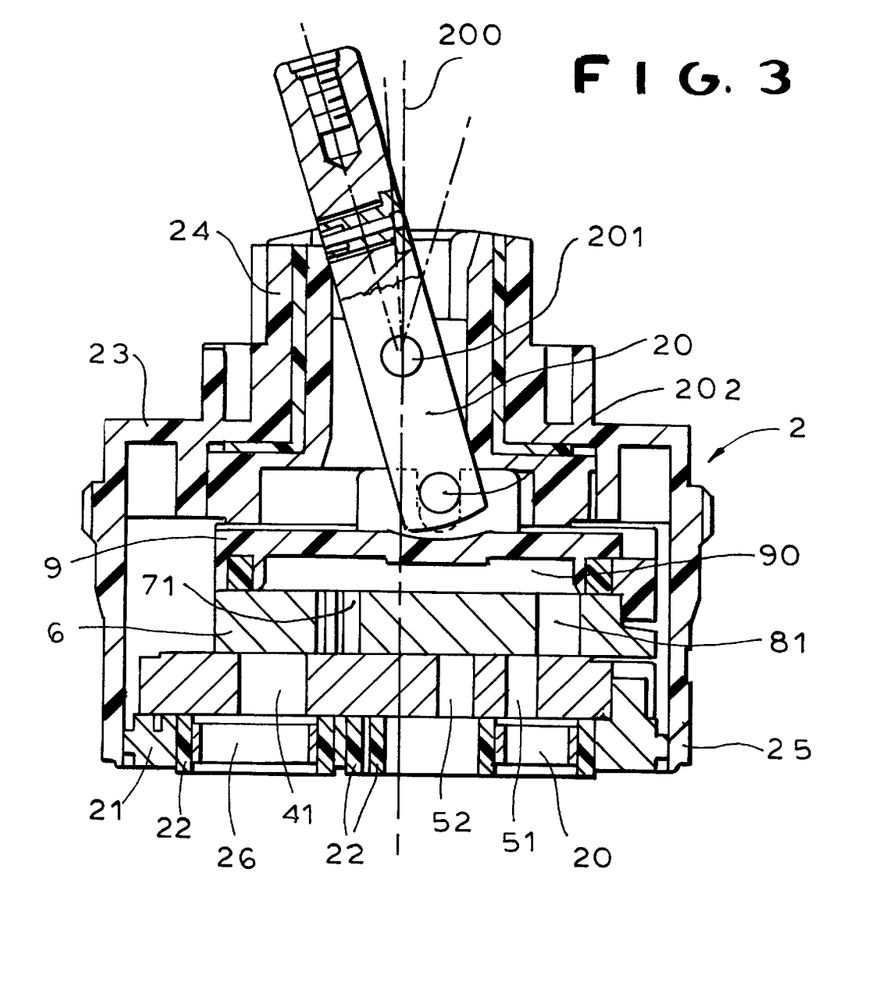
FIG. 3 is a vertical section through the cartridge of the FIG. 1 valve in the no-flow position.

The cartridge 2 shown in FIG. 3 has a housing 25 centered on a normally upright axis 200 and having a fixed base plate 21 formed with ports 26 having O-ring seals 22. The housing 1 has passages 110 and 120 leading from the inlet connections 11 and 12 to two of the ports 26 and outlet passages 130 and 160 leading from two of the ports 26 to the outlet connections 13 and 16. Sitting atop the plate 21 is a fixed ceramic valve plate 3 shown in FIG. 5 and having a pair of short sector-shaped inlet ports 41 connected through two of the ports 26 to the passages 110 and 120 and a pair of arcuate outlet ports 51 and 52 connected through two others of the ports 26 to the passages 130 and 160.

Figure 4:
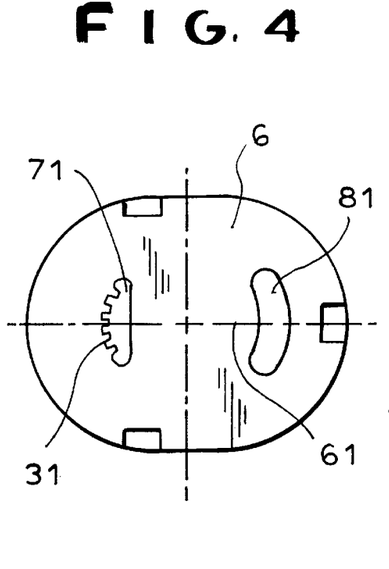
FIGS. 4 and 5 are top views of the valve plates of the cartridge of FIG. 3.
Figure 5:
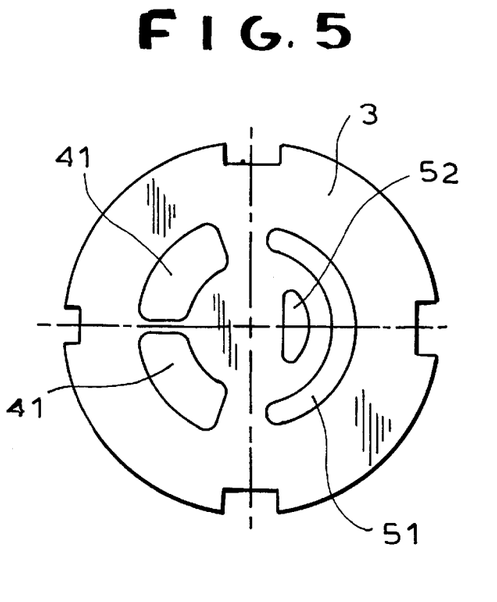

Sitting atop the planar upper surface of the fixed disk 3 is a movable control disk 6 formed with a single part-circular inlet port 71 and a single arcuate outlet port 81 both centered on a symmetry axis 61 of the disk 6. The port 71 has along its rounded front edge a plurality of flow-quieting teeth 31, and similar teeth can be provided to quiet flow on the port 81 or any of the other ports. The disk 6 is fixed to a control or cover element 9 that forms a compartment or passage 90 that in turn forms a fluid-communication link between the ports 71 and 81. This element 9 is pivoted at 202 to the lower end of a lever 20 pivoted at an axis 201 transverse to the axis 200 on a further element or sleeve 23 that can rotate in the housing 25 about the axis 200. The handle 10 is fixed to the upper end of the lever 20 and the element 23 is provided with an elastically deflectable stop 24 as described in U.S. Pat. No. 5,522,429.

Figure 6:
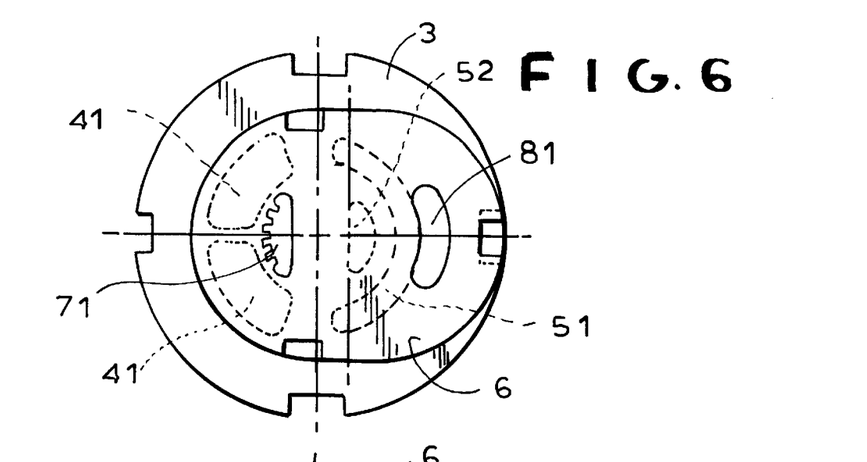
FIGS. 6, 7, and 8 are top views showing the valve plates of FIGS. 4 and 5 in the closed, shower-only, and spout-only flow positions, respectively.

In a closed position of the valve shown in FIGS. 3 and 6 the plate 6 is shifted to the rear (rightward in the drawing) so that the inlet opening 71 does not overlap either of the inlet ports 41 of the plate 3. Thus the pressurized inlet water from the passages 110 and 120 is stopped at the planar bottom surface of the ceramic plate 6 and there is no flow through the valve.

Figure 7:
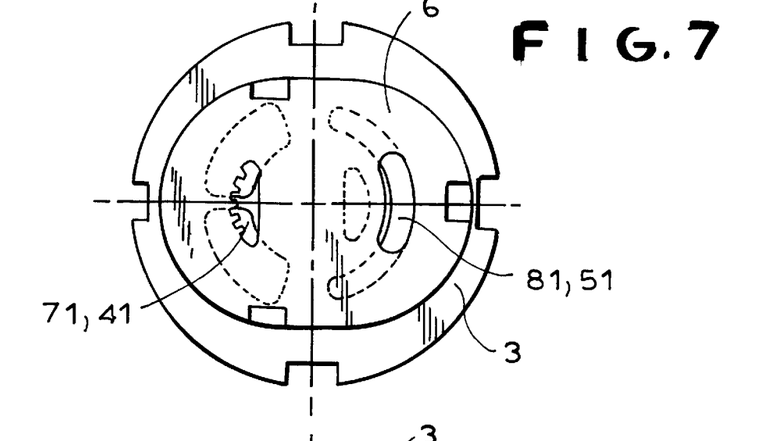

As the front end of the handle 10 is raised, the plate 6 is moved forward (leftward in the drawing) into the position of FIG. 7. First the outlet port 81 comes into alignment over the port 51, then the inlet port 71 comes over the ports 41. Hot and cold water can thus flow from the ports 41 through the port 71 and passage 90 to the port 81 and thence out the port 51 and through the passage 130 to the shower connection 13. In this position the lever 20 rests against the stop 24.

Figure 8:
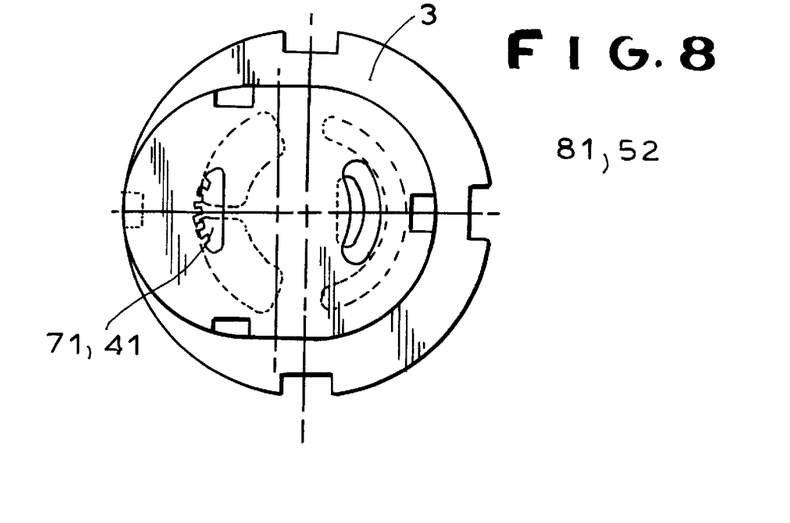
Figure 9:
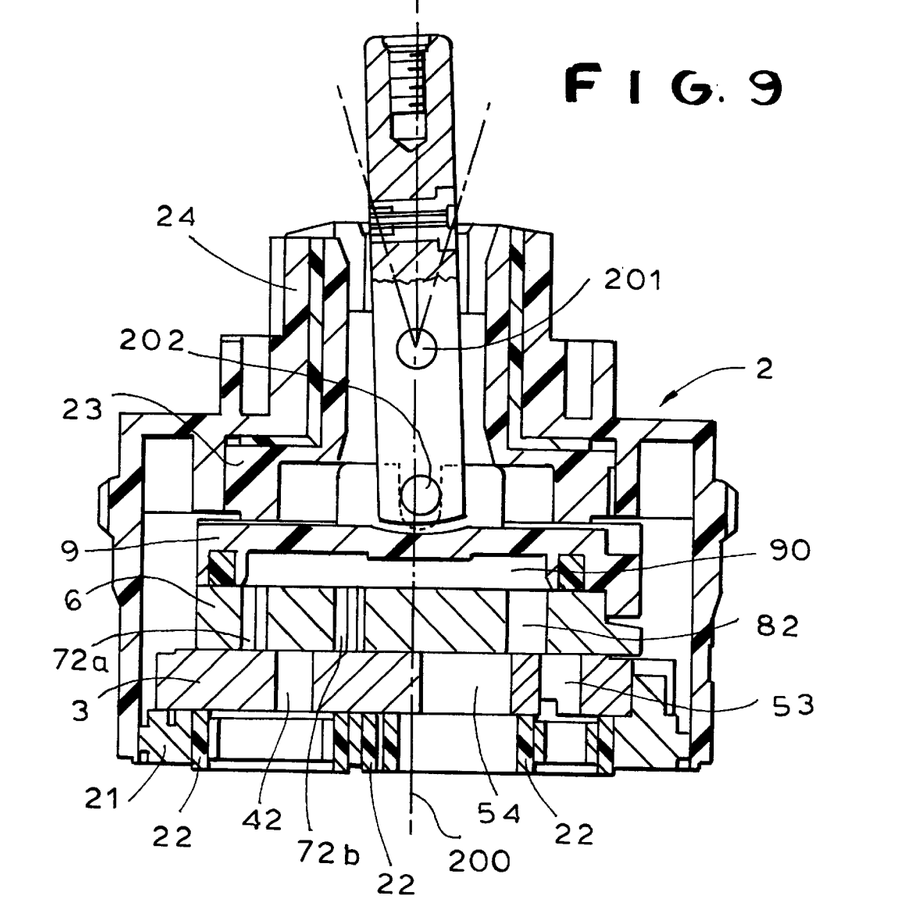
FIG. 9 is a view like FIG. 3 of a second valve cartridge according to the invention.
Figure 10:
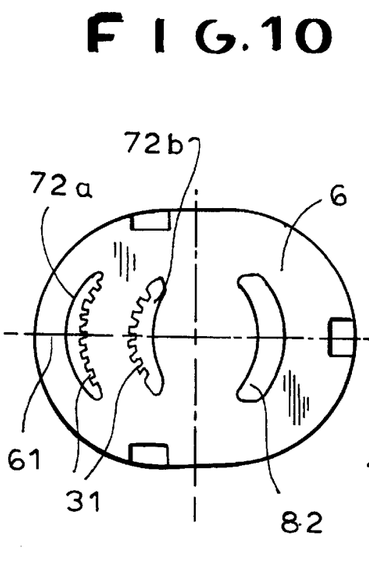
FIGS. 10 and 11 are top views of the valve plates of the cartridge of FIG. 9.
Figure 11:
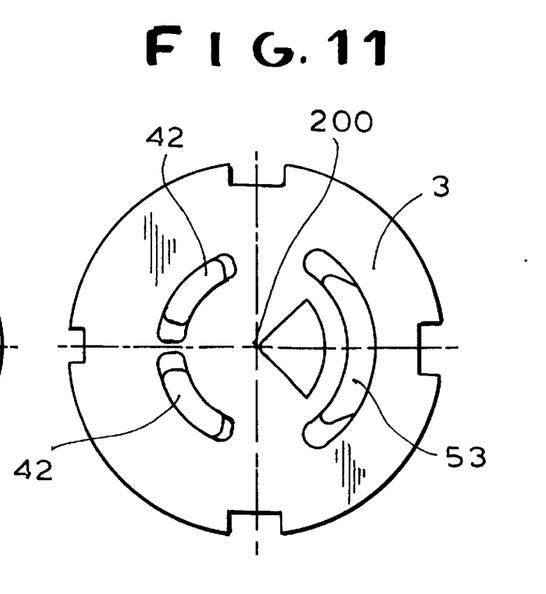

On further forward movement of the plate 6 by further lifting of the front end of the handle 10 the outlet port 81 will briefly move through a position in which it is over both the port 51 and the port 52, providing flow out to both the shower and the basin. On further forward movement as shown in FIG. 8, the port 81 will leave the port 51 completely and lie only over the opening 52, directing all flow through the passage 160 to the spout outlet 16. Of course by reversal of the passages 130 and 160 it would be possible to feed first to the spout outlet 16 and then to the shower outlet 130.

In both the positions of FIGS. 7 and 8 rotation of the handle 10 about the axis 200 will change the mix, that is the temperature of the outputted water. Similarly as the port 71 is moved from a position partly over the ports 41 to one completely over them, the volume of flow will increase. These ports 41 have a radial dimension relative to the axis 200 that is at least twice as wide as the radial dimension of either of the ports 51 and 52 and sufficient to ensure that as the port 81 moves from the port 51 to the port 52 and vice versa the port 71 will remain over the ports 41. Since at no time on changeover between the ports 51 and 52 is the flow completely halted, the temperature setting will remain the same.

In the arrangement of FIGS. 9 through 14, where the same reference numerals as in FIGS. 1 through 8 are used for structurally or functionally identical structure, the valve plate 3 has a pair of arcuate inlet ports 42 to one side of the axis 200 and to the opposite side an arcuate outer outlet port 53 connected to the shower outlet 13 and an inner outlet port 54 connected to the spout outlet 16. As in FIGS. 1 through 8, the ports 42, 53, and 54 all have outer surfaces centered on the axis 200. The ports 42 and 53 have inner surfaces also centered on the axis 200 while the port 54 comes basically to a point very near the axis 200. The disk 6 has an outlet port 82 substantially identical to the port 81 of FIGS. 1 through 8 and two circularly segmental inlet ports 72a and 72b.

Figure 12:
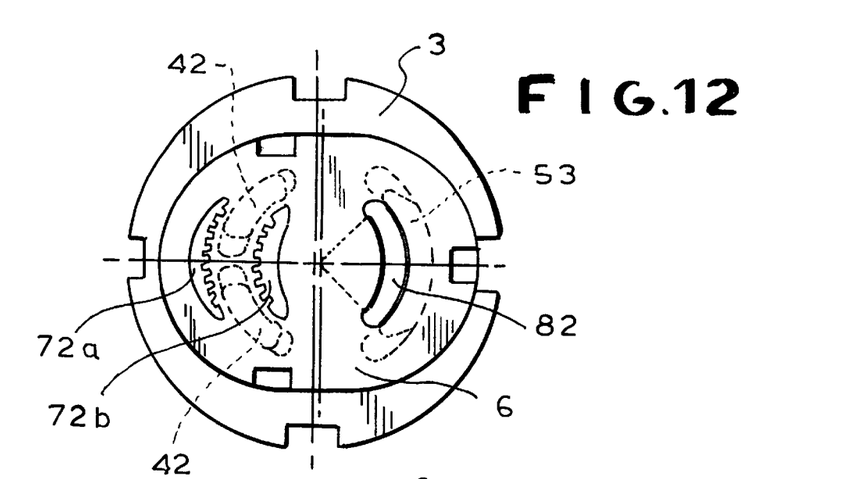
FIGS. 12, 13, and 14 are top views showing the valve plates of FIGS. 10 and 11 in the closed, shower-only, and spout-only flow positions, respectively.
Figure 13:
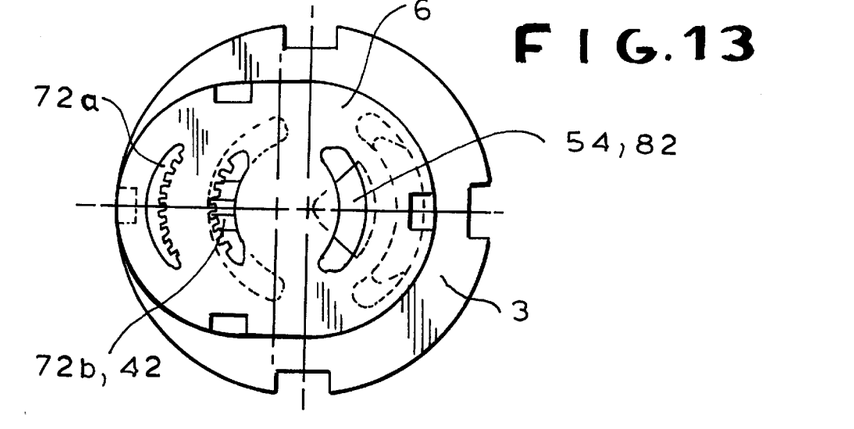
Figure 14:
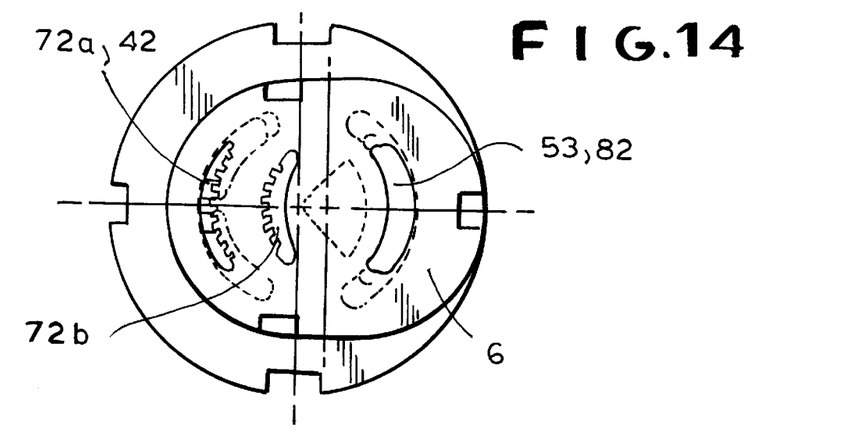
Figure 15:
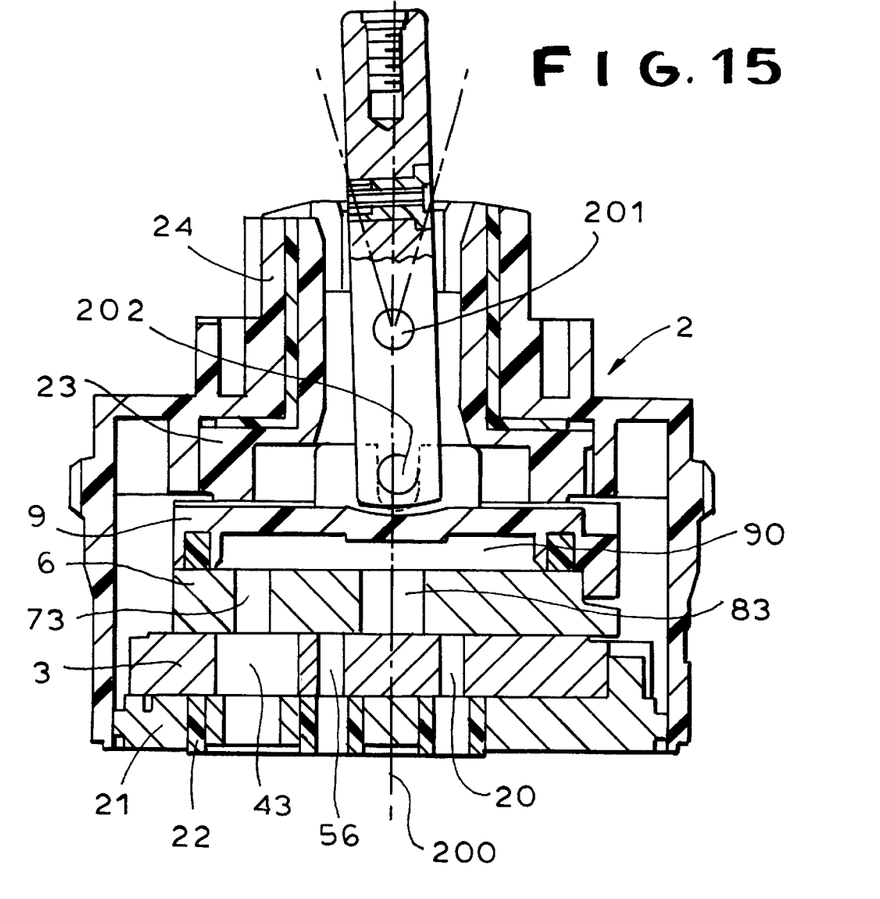
FIG. 15 is a view like FIG. 3 of a third valve cartridge according to the invention.
Figure 16:
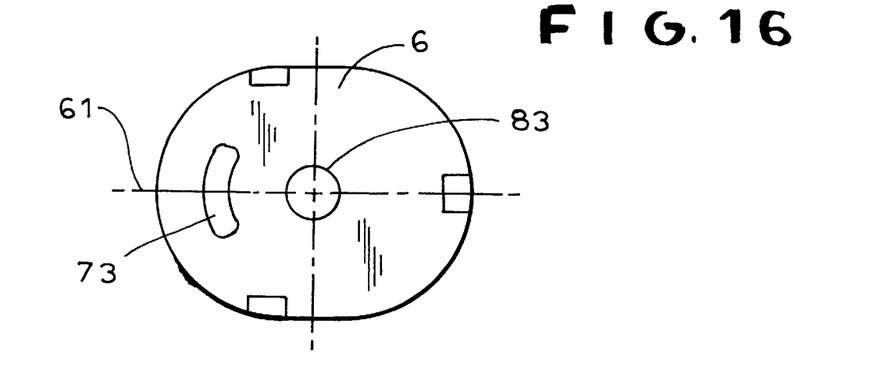
FIGS. 16 and 17 are top views of the valve plates of the cartridge of FIG. 15.
Figure 17:
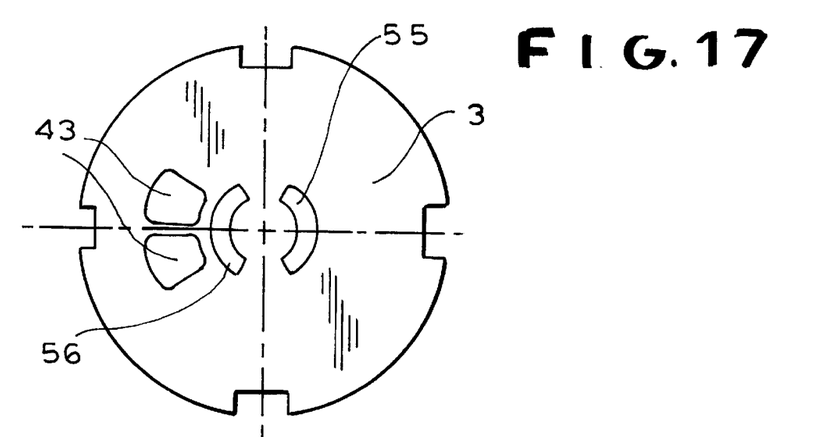

In a closed or starting position shown in FIG. 12 the inlet ports 72a and 72b flank but do not overlap the inlet ports 42 so that flow through the valve is blocked, while the outlet port 82 lies between the ports 53 and 54. When the control disk 6 is shifted forward as shown in FIG. 13 the port 72b moves over the inlet ports 42 while the port 82 moves over the outlet port 54, sending flow to the faucet outlet 16. When the control disk 6 is shifted rearward as shown in FIG. 14 the port 72a moves over the inlet ports 42 while the port 82 moves over the outlet port 53, sending flow to the shower outlet 13. As in FIGS. 1 through 8, shifting the plate 6 about the axis 200 changes the temperature of the water by increasing the flow cross section from one of the ports 42 while decreasing that from the other.

Figure 18:
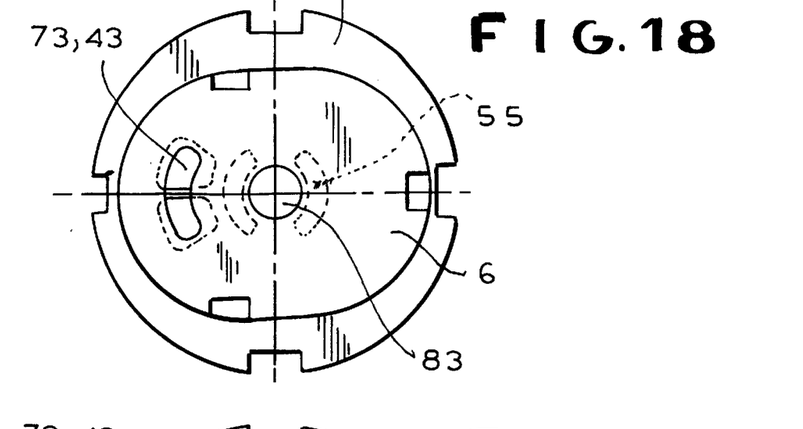
FIGS. 18, 19, and 20 are top views showing the valve plates of FIGS. 16 and 17.in the closed, shower-only, and spout-only flow positions, respectively.
Figure 19:
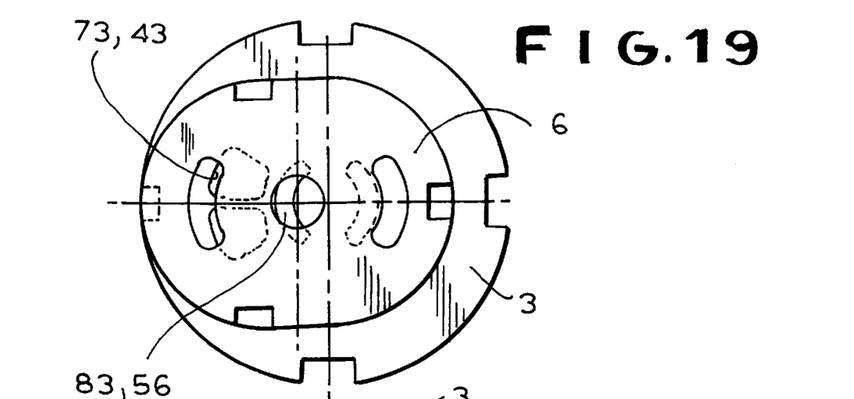
Figure 20:
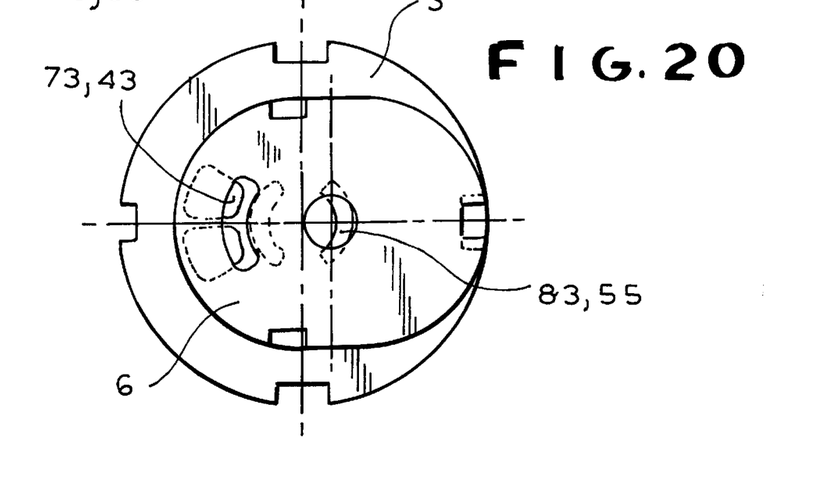
Figure 21:
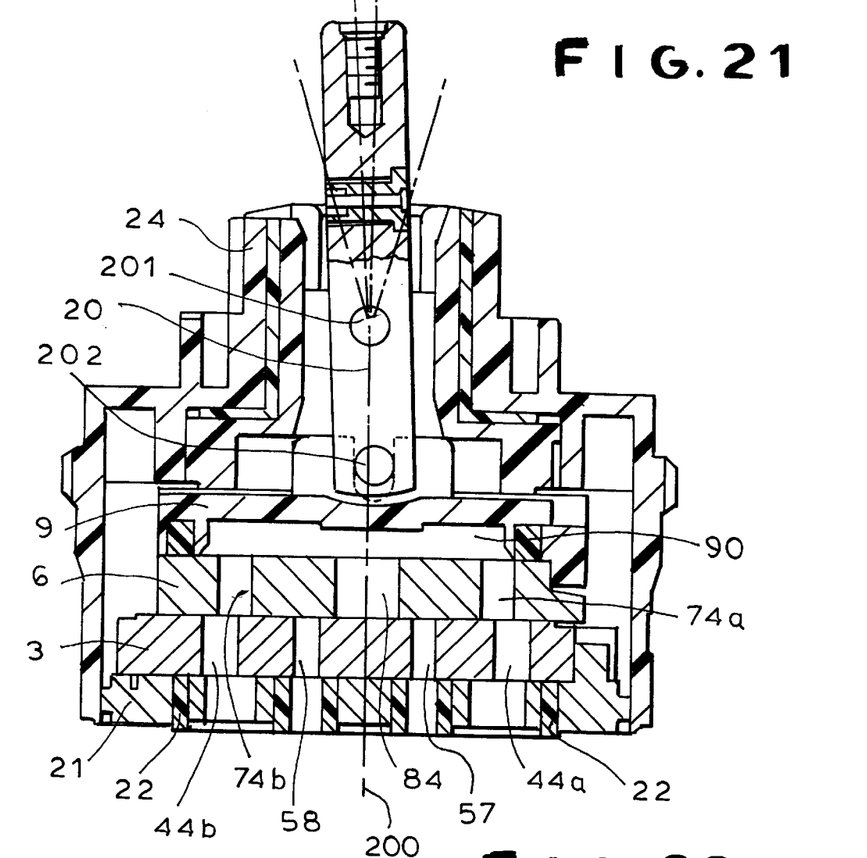
FIG. 21 is a view like FIG. 3 of a fourth valve cartridge according to the invention.
Figure 22:
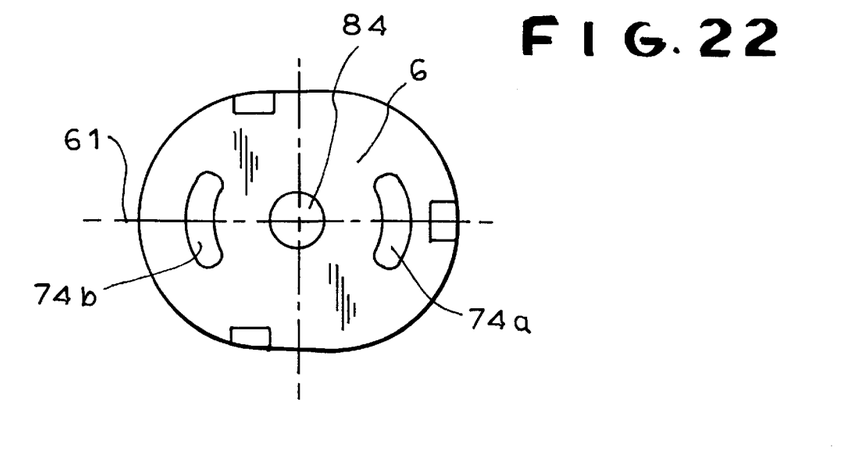
FIGS. 22 and 23 are top views of the valve plates of the cartridge of FIG. 21.
Figure 23:
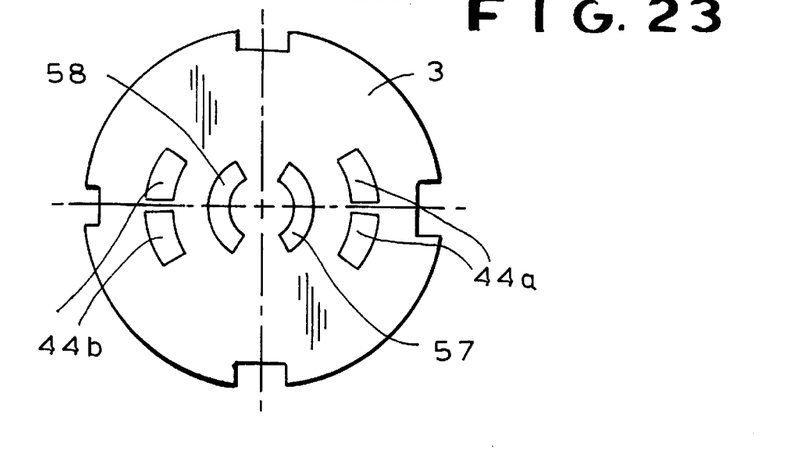
Figure 24:
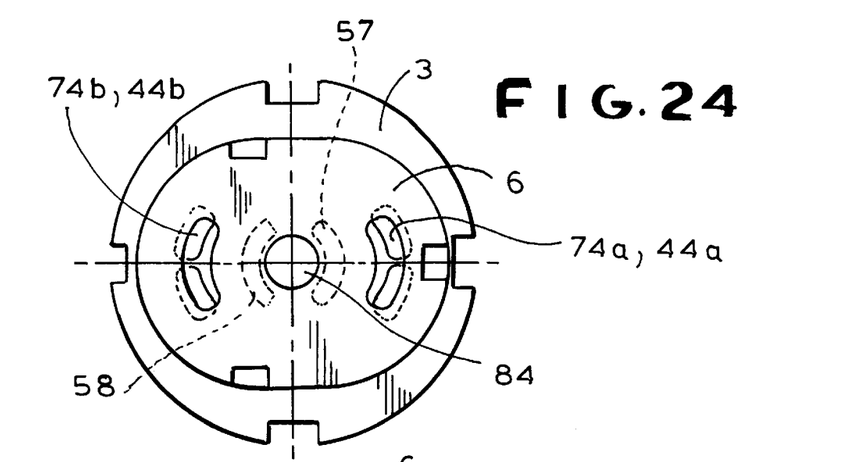
FIGS. 24, 25, and 26 are top views showing the valve plates of FIGS. 22 and 23 in the closed, shower-only, and spout-only flow positions, respectively.

The system of FIGS. 15 through 20 has a disk 3 with two inlet ports 43 and a pair of identical part-circular outlet ports 55 and 56 symmetrically flanking the axis 200. The disk 6 has an arcuate inlet port 73 and a central circular outlet port 38. Thus as shown in FIG. 18 in the closed position the port 83 lies between the ports 55 and 56 and there is no flow. When moved in one direction as shown in FIG. 19 the port 83 overlaps the port 56 for flow, for instance, to the faucet outlet 16 and when moved in the opposite direction as shown in FIG. 20 flow is out the other port 55, to the shower connection 13.

Figure 25:
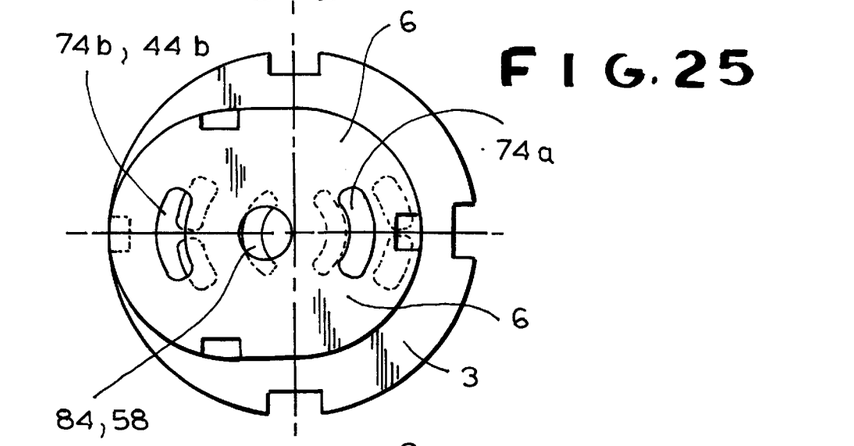
Figure 26:
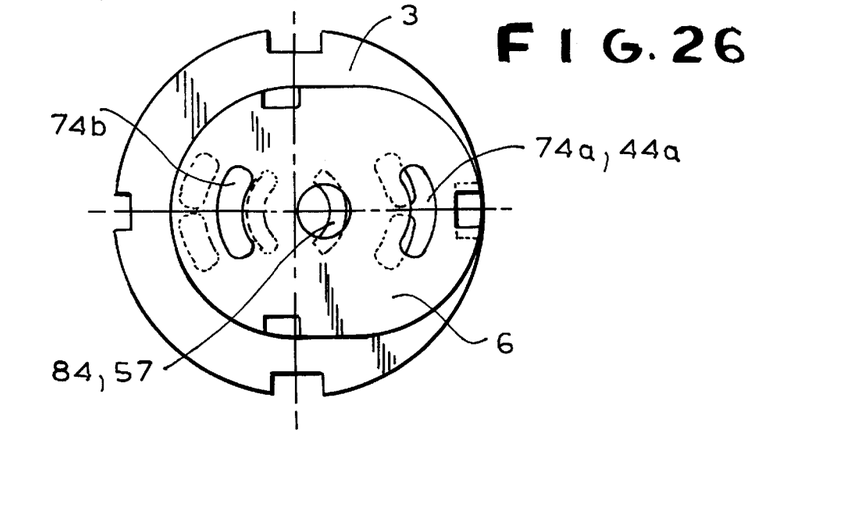

The valve of FIGS. 21 through 26 has a disk 3 with two sets of inlet ports 44a and 44b, one of each for hot water and the other for cold water, and two identical outlet ports 57 and 58 like the ports 55 and 56. The movable disk 6 has a central outlet port 84 like the port 83 and a pair of inlet ports 74a and 74b each shaped as a segment of a circular annulus like the port 73. In the closed position of FIG. 24 the outlet port 84 lies 5 between the ports 57 and 58 and there is no flow, even though each of the ports 74a and 74b overlaps the respective two inlet ports 44a and 44b. When moved forward as shown in FIG. 25, the port 84 overlaps the port 58 for flow therefrom and when oppositely moved the port 84 overlaps the port 57 for flow therefrom. In each of the end positions of FIGS. 25 and 26, one of the ports 74a or 74b is completely out of service, that is between the respective ports 44a and 57 or 44b and 58, while the other port 74b or 74a is active.

We claim:

1. A mixing valve comprising:
    a housing;
    a fixed valve plate in the housing having a flat outer surface generally centered on and perpendicular to an axis and formed offset from the axis with a pair of angularly offset and axially throughgoing inlet ports and offset therefrom with a pair of axially throughgoing outlet ports;
    means for supplying water under pressure to the inlet ports;
    passages in the housing for connecting the outlet ports to respective users;
    a movable valve plate in the housing having an inner surface flatly engaging the outer surface of the fixed valve plate and an opposite outer surface, the movable valve plate being formed with an axially throughgoing inlet port alignable with the fixed-plate inlet ports and offset from the respective inlet port an axially throughgoing outlet port alignable with the fixed-plate outlet ports;
    a cover element fixed in the housing to the outer surface of the movable plate and forming a fluid-flow passage at the outer surface between the movable-plate inlet port and the movable-plate outlet port; and
    actuating means for shifting the cover element and movable plate between
        a closed position with one of the movable-plate ports out of alignment with the respective fixed-plate ports and blocked by the fixed-plate outer face,
        one open position with the movable-plate inlet port aligned with at least one of the fixed-plate inlet ports and the movable-plate outlet port aligned with one of the fixed-plate outlet ports, and
        another open position with the movable-plate inlet port aligned with at least one of the fixed-plate inlet ports and the movable-plate outlet port aligned with the other of the fixed-plate outlet ports.

2. The mixing valve defined in claim 1 wherein in the closed position the movable-valve inlet port is blocked by the fixed-plate outer face.

3. The mixing valve defined in claim 1 wherein in the closed position the movable-valve outlet port is blocked by the fixed-plate outer face.

4. The mixing valve defined in claim 1 wherein at least one of the ports has an edge formed with flow-quieting teeth.

5. The mixing valve defined in claim 1 wherein the movable valve plate lies in the closed position between the positions it assumes in the open positions.

6. The mixing valve defined in claim 1 wherein the ports are formed at least partially as circle segments.

7. The mixing valve defined in claim 1 wherein the fixed-plate inlet ports have a radial dimension equal to about twice a radial dimension of the movable-plate inlet port, the fixed-plate outlets being radially spaced from each other and formed at least partially as circle segments, the movable plate outlet port lying radially outside the fixed-plate outlet ports in the closed position, whereby as the movable-plate outlet port is moved radially inward it first overlaps one of the fixed-plate outlet ports and then the other of the fixed-plate outlet ports.

8. The mixing valve defined in claim 7 wherein the movable-plate outlet port has a radial dimension greater than a radial spacing between the fixed-plate outlet ports, whereby on movement between the open positions the movable-plate outlet port can overlie both fixed-plate outlet ports.

9. The mixing valve defined in claim 1 wherein the movable plate is formed with a pair of radially spaced such inlet ports, the fixed-plate outlet ports being radially spaced from each other, the fixed-plate inlet ports lying between the movable-plate inlet ports and the movable plate outlet port lying between the fixed-plate outlet ports in the closed position, whereby the movable plate is displaced radially in one direction from the closed position to the one open position and in the opposite direction to the other open position.

10. The mixing valve defined in claim 1 wherein the fixed-plate outlet ports flank the axis, the movable-plate outlet port being generally circular, lying between the movable-plate outlet ports, and centered on the axis in the closed position.

11. The mixing valve defined in claim 10 wherein the fixed plate is formed with two pairs of such inlet ports symmetrically flanking the axis outside the respective outlet ports, the movable disk being formed with two such inlet ports symmetrically flanking the axis in the closed position.

\* \* \* \* \*